(12) United States Patent
Miyabe et al.

(10) Patent No.: US 7,353,903 B2
(45) Date of Patent: Apr. 8, 2008

(54) AIR CLEANER FOR STRADDLE VEHICLE

(75) Inventors: Toshimasa Miyabe, Shizuoka (JP); Masahiro Noda, Shizuoka (JP); Gen Ohzono, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 358 days.

(21) Appl. No.: 11/234,821

(22) Filed: Sep. 23, 2005

(65) Prior Publication Data

US 2006/0065457 A1 Mar. 30, 2006

(30) Foreign Application Priority Data

Sep. 24, 2004 (JP) ............... 2004-277464

(51) Int. Cl.
*B62K 11/00* (2006.01)
(52) U.S. Cl. ............ 180/219; 180/218; 180/220; 123/198 E
(58) Field of Classification Search ............ 180/218, 180/219, 220; 123/198 E
See application file for complete search history.

(56) References Cited

U.S. PATENT DOCUMENTS 6,349,785 B1 * 2/2002 Ohmika et al. ............ 180/227
6,547,024 B2 * 4/2003 Ohyama et al. ............ 180/227
6,615,945 B2 * 9/2003 Minami et al. ............ 180/219

FOREIGN PATENT DOCUMENTS

JP 2002-037170 2/2002
WO 03/001048 1/2003

* cited by examiner

*Primary Examiner*—Lesley D. Morris
*Assistant Examiner*—Michael Stabley
(74) *Attorney, Agent, or Firm*—Hogan & Hartson LLP (57) ABSTRACT

An air cleaner is prevented from sucking mud etc., while a relatively large space is ensured in front of a seat, in an under bone type straddle type vehicle which has an area recessed downward in front of the seat. An air cleaner is disposed in the rear of a cylinder block of an engine. The air cleaner includes a cleaner case that is taller than it is broad and a lid that covers a top of the cleaner case. An intake pipe is positioned at a rear side of the lid. The intake pipe is disposed within a space surrounded by the seat and a forward descending portion of a seat front cover, and opens obliquely upward rearward. A labyrinth structure is formed above the intake pipe for preventing drops of water from entering the intake pipe from the seat.

6 Claims, 7 Drawing Sheets

AIR CLEANER FOR STRADDLE VEHICLE

BACKGROUND OF THE INVENTION

1. Field of the Invention

This invention relates to a straddle type vehicle such as a motorcycle, for example.

2. Description of Related Art

Conventionally, in straddle type vehicles such as motorcycles etc., the so-called under bone type frame structure is known (See Patent Documents 1 and 2, for example). In straddle type vehicles having the under bone type frame structure, an area extending in front of the seat is greatly recessed to define a relatively large space in the front area of the seat. A rider thus can easily get on and off the vehicle.

On the other hand, in order to ensure such a large space in front of the seat, some ideas are necessary for layout of an engine and auxiliaries. Particularly, an air cleaner needs to be well considered about its positioning location and layout of its air inlet port, because the air cleaner is a component having a large capacity.

The motorcycle disclosed in Patent Document 1 includes a main frame obliquely extending downward rearward from a head pipe, and a rear frame obliquely extending upward rearward from a rear portion of the main frame. An engine is supported by the main frame under a suspended condition. A fuel tank and a seat are mounted on the rear frames. An air cleaner is positioned below a forward end of the main frame so as to avoid the recessed portion.

The motorcycle disclosed in Patent Document 2 includes a main frame obliquely extending downward rearward from a head pipe, and seat rails obliquely extending upward rearward from a rear portion of the main frame. Similarly, an engine of this motorcycle is supported by the main frame under the suspended condition, and a fuel tank and a seat are mounted on the rear frames. On the other hand, in this motorcycle, an air cleaner is positioned in the rear of the engine and below the seat rails so as to avoid the recessed portion.

Patent Document 1 is WO 03/001048, Pamphlet, and Patent Document 2 is JP-A-2002-37170, Laid-open Patent Application Publication.

However, in the motorcycle disclosed in Patent Document 1, because the air cleaner is positioned below the forward end of the main frame, consequently, the air cleaner is positioned in the vicinity of a front wheel. Therefore, when mud, water or the like is raised up by the front wheel, the mud etc. is apt to be sucked into the air cleaner.

On the other hand, in the motorcycle disclosed in Patent Document 2, because the air cleaner is positioned in the rear of the engine and below the seat rails, consequently, the air cleaner is positioned in the vicinity of a rear wheel. Therefore, when mud, water or the like is raised up by the rear wheel, the mud etc. is apt to be sucked into the air cleaner.

SUMMARY OF THE INVENTION

This invention is made under the circumstances, and an object thereof is to prevent an air cleaner from sucking mud etc., while a relatively large space is ensured in front of a seat, in an under bone type straddle type vehicle.

A straddle type vehicle according to the present invention is directed to a vehicle having a vehicle body including a vehicle body frame having a head pipe connected to a shaft that supports a front wheel for rotation, a front frame connected to the head pipe and obliquely extending downward rearward, and a rear frame connected to the front frame and obliquely extending upward rearward. The vehicle includes an engine having a crankcase and a cylinder block extending forward (including a horizontally forward direction and an obliquely forward upward direction) therefrom. The engine is supported by the front frame. The vehicle includes a seat supported by the rear frame, a rear arm supported by the vehicle body for swinging and extending rearward, a rear wheel supported by the rear arm for rotation, and positioned under, or obliquely below and in the rear of a rear portion of the seat, a seat front cover that is positioned below and ahead of the seat to define a space recessed downward as a top open concave, in a side elevational view, by continuously forming a forward ascending portion that inclines downward rearward from a front portion thereof and a forward descending portion that inclines upward rearward from the front portion, and an air cleaner including an air intake portion disposed within a space surrounded by the seat and the forward descending portion of the seat front cover.

According to this straddle type vehicle, the air intake portion of the air cleaner is spaced apart from both of the front wheel and the rear wheel. That is, the air intake port is placed at a rear location sufficiently far from the front wheel, while it is placed at a forward location sufficiently far from the rear wheel. In addition, the air intake port is positioned sufficiently higher than the front wheel and the rear wheel. Therefore, even though the mud etc. is raised up by the front wheel or the rear wheel, the mud etc. are hardly sucked into the air intake portion.

Additionally, the space surrounded by the seat and the forward descending portion of the seat front cover is the so-called dead space that is not effectively used. According to the straddle type vehicle, the dead space can be effectively used. The space in front of the seat thus is not spoiled by the air intake portion. Accordingly, the air cleaner is prevented from sucking the mud etc., while ensuring the relatively large space in front of the seat.

Preferably, the air cleaner has a box-like air cleaner body in which the air intake portion is positioned, the air cleaner body is disposed in the rear of the cylinder block of the engine, and the air intake portion is positioned at a rear side of the air cleaner body.

Thus, the air cleaner body is interposed between the air intake portion and the cylinder block of the engine. As a result, the air cleaner body insulates the heat around the cylinder block, and hot air is inhibited from being sucked through the air intake portion. Also, differing from a situation in which the air cleaner body is spaced apart from the air intake portion, a distance between the air intake portion and the air cleaner body is short. Therefore, intake resistance can be small.

Preferably, the air intake portion has an inlet port opening upward or obliquely upward.

Thus, the mud etc. raised up by the front wheel or the rear wheel is further hardly sucked into the air intake portion.

Preferably, the straddle type vehicle includes a hinge mechanism provided at a lower portion of a front end of the seat, and the air intake portion is positioned below the hinge mechanism.

In this way, the dead space below the hinge mechanism can be effectively used.

Preferably, the straddle type vehicle has a labyrinth structure including a first irregular portion that is formed at the lower portion of the front end of the seat to be concave or convex forward, and a second irregular portion that is formed at the seat front cover to be convex or concave rearward and that makes a zigzag gap with the first irregular portion therebetween by opposing to the first irregular portion in a fore to aft direction.

In this way, the labyrinth structure hinders water from entering. Thus, water is prevented from being sucked into the air inlet portion even when it rains or on other occasions.

Preferably, a wall surface is positioned below the seat to partition a space above or in the rear of the intake air portion from the external space.

Thus, mud etc. is certainly prevented from entering from an upper or rear location of the air intake portion. Additionally, if a vehicle component such as a battery, a fuel tank and a storage box, for example, is positioned in the rear of the air intake portion, then a portion of the vehicle component can be used as the wall surface.

As described above, in accordance with the present invention, the air intake portion can be spaced apart from the front wheel or the rear wheel without spoiling the space in front of the seat. Thus, the air cleaner is prevented from sucking the mud etc., while the relatively large space is ensured in front of the seat.

DETAILED DESCRIPTION OF THE INVENTION

Hereunder, an embodiment of the present invention is described in detail based upon the accompanying drawings.

Figure 1:
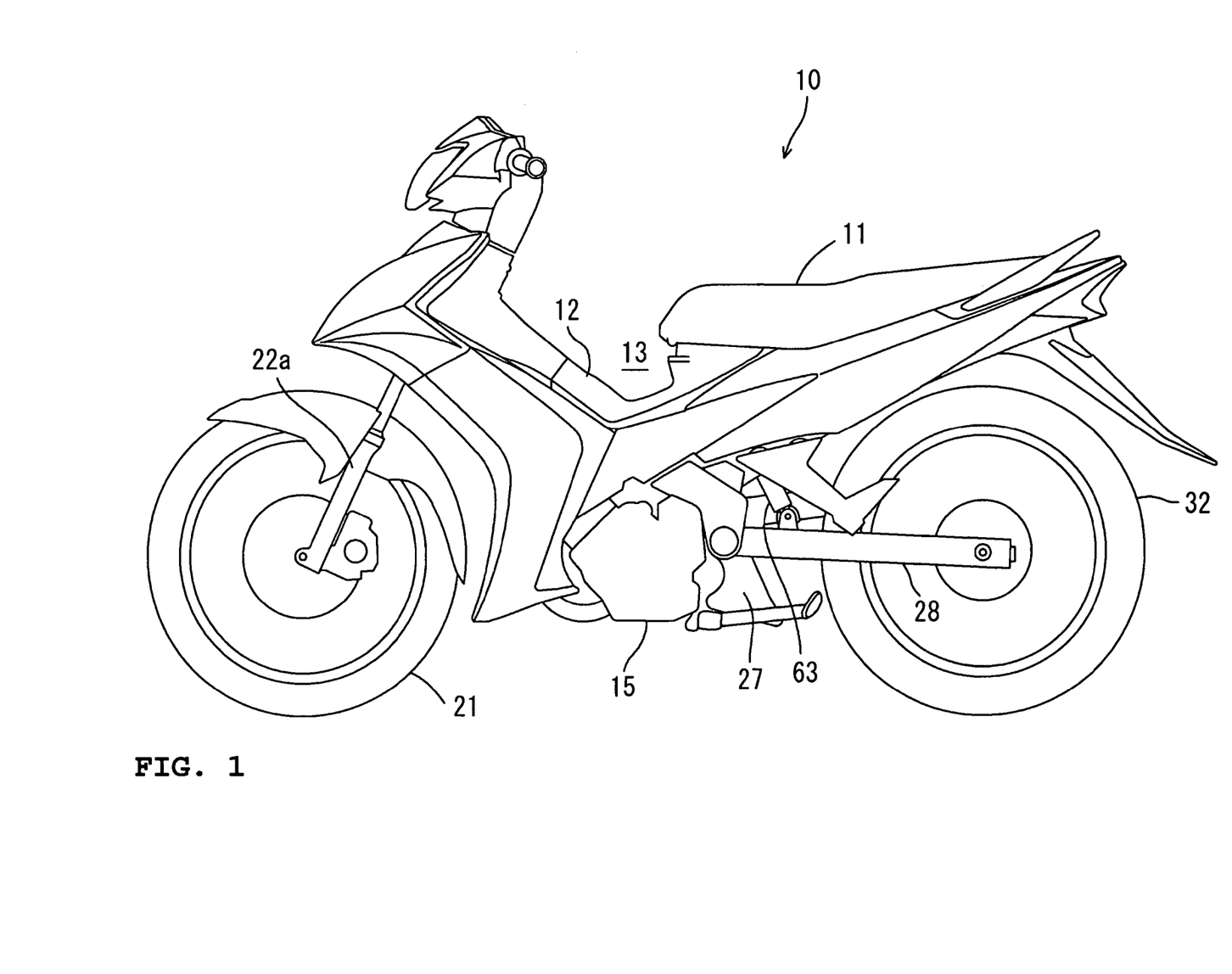
FIG. 1 is a side elevational view of a motorcycle according to an embodiment.

As shown in FIG. 1, a straddle type vehicle according to an embodiment is a motorcycle 10 having an under bone type frame structure. A detachable seat front cover 12 is attached below and ahead of a seat 11. The seat front cover 12 curves or bends to be a generally concave shape as seen in a side elevational view. The seat front cover 12 defines a space 13 that is recessed downward in front of the seat 11.

Figure 2:
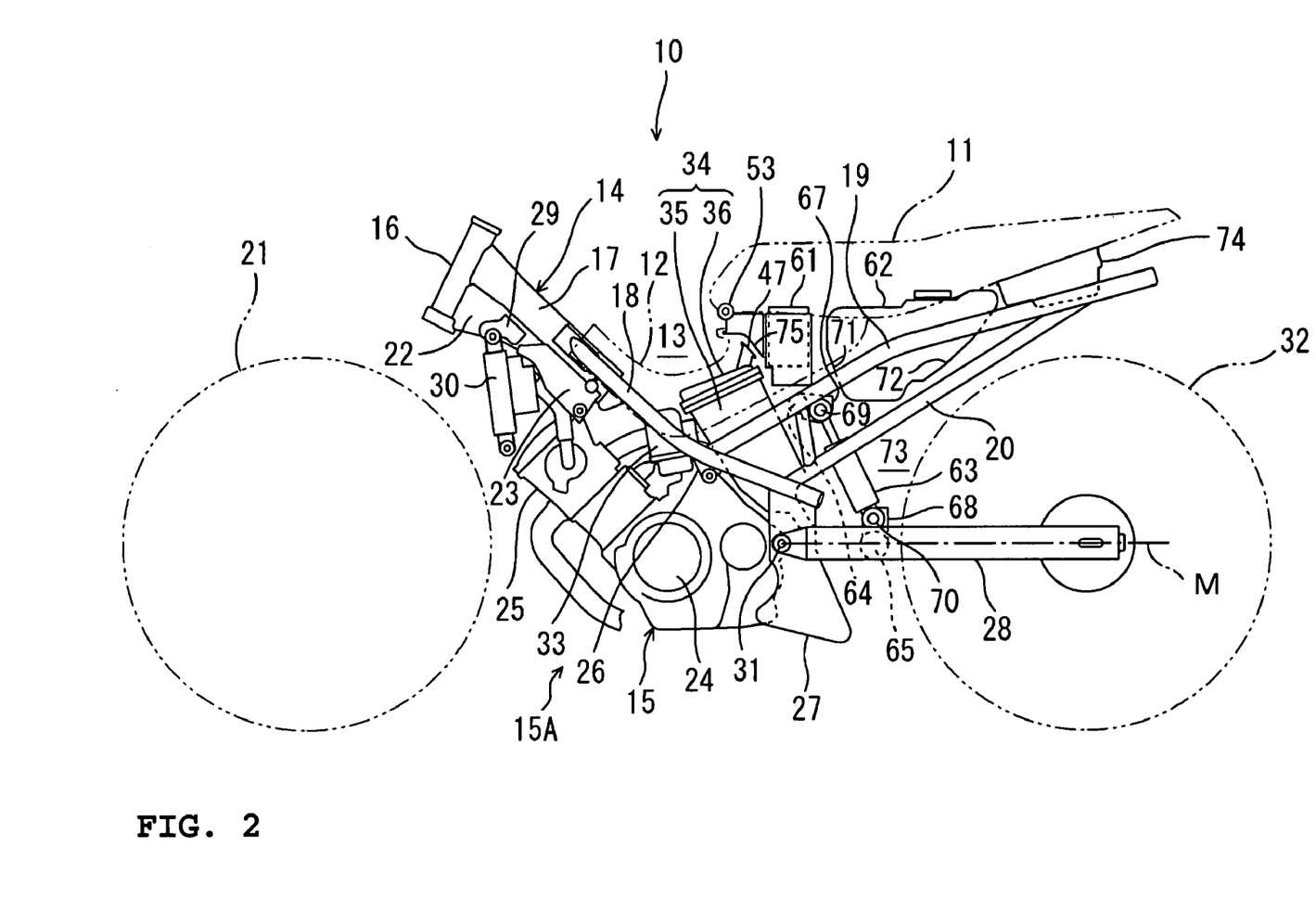
FIG. 2 is a side elevational view, showing an internal structure of the motorcycle.

As shown in FIG. 2, the motorcycle 10 has a vehicle body frame 14, and an engine 15 supported by the vehicle body frame 14 under a suspended condition. The vehicle body frame 14 and the engine 15 together form a vehicle body 15A. The engine 15 includes a crankcase 24 and a cylinder block 25 obliquely extending upward forward from the crankcase 24. The vehicle body frame 14 includes a head pipe 16, a single main frame 17, a pair of a right and a left sub frame 18, a pair of a right and a left seat rail 19 and a pair of a right and a left backstay 20.

A steering shaft, which is not shown, passes through the head pipe 16. A lower portion of the steering shaft has a front fork 22a (see FIG. 1). A lower end of the front fork 22a supports a front wheel 21 for rotation.

The main frame 17 is connected to a rear surface of the head pipe 16 and obliquely extends downward rearward. The main frame 17 is rectangular and hollow in cross section. However, the main frame 17 may have any other shapes. A gusset 22 is affixed to a front half area of a bottom surface of the main frame 17. The gusset 22 extends between the bottom surface of the main frame 17 and the rear surface of the head pipe 16.

The sub frames 18 are affixed to respective right and left side surfaces of the main frame 17. Each sub frame 18 has a diameter smaller than that of the main frame 17. A cross sectional area of each sub frame 18 is smaller than that of the main frame 17. The major part of each sub frame 18 has a circular pipe shape in cross section. However, a flat plate shape replaces the circular shape of a front end of each sub frame 18 toward the front end. The flat plate shaped portion of the front end of each sub frame 18 is joined with the respective side surface of the main frame 17 by welding or the like under a condition that a surface of the flat plate shaped portion abuts on the side surface of the main frame 17. Thus, the pair of the right and left sub frame 18 are connected to the respective side surfaces of the main frame 17.

Each sub frame 18 bends in such a manner that its center portion in its longitudinal direction extends convexly downward. A front portion (a portion ahead of the bending portion) of each sub frame 18 extends generally parallel to an axial direction of the cylinder block 25 of the engine 15. A rear portion of each sub frame 18 has a slope that is gentler than that of the front portion. As discussed, the sub frames 18 are shaped and disposed along the engine 15.

Each seat rail 19 is joined with the vicinity of the bending portion of the respective sub frame 18 by welding or the like. Thereby, each seat rail 19 obliquely extends upward rearward from the vicinity of the bending portion of each sub frame 18. Each seat rail 19 bends in such a manner that its center portion in its longitudinal direction extends convexly upward. Each seat rail 19 is made from a circular pipe.

Each backstay 20 is joined with a rear end of the respective sub frame 18 by welding or the like. Therefore, each backstay 20 obliquely extends upward rearward from the rear end of the sub frame 18. A rear end of each backstay 20 is joined with a rear end of the respective seat rail 19 by welding or the like. Similarly to the seat rail 19, each backstay 20 is made from a circular pipe.

The main frame 17 and the sub frames 18 together form a front frame. The seat rails 19 an the backstays 20 form a rear frame. Additionally, the sub frames 18, the seat rails 19 and the backstays 20 may have any shapes other than the circular pipe shape. The vehicle body frame 14 may be made of iron, aluminum or other materials.

A bracket 23 is affixed to the bottom surface of a rear end of the main frame 17. The cylinder block 25 is attached to the bracket 23 via bolts and nuts. Brackets 26 are affixed to the vicinity of the bending portions of the respective sub frames 18. The crankcase 24 of the engine 15 is attached to the brackets 26 via bolts and nuts. Another bracket 27 is affixed to respective rear ends of the sub frames 18. The bracket 27 supports both the crankcase 24 of the engine 15 and rear arms 28. As discussed, the engine 15 is supported by the main frame 17 and the sub frames 18 under the suspended condition.

A front end of each rear arm 28 is supported by the bracket 27 for swinging about an axis of a pivot shaft 31. A rear end of each rear arm 28 supports a rear wheel 32 for rotation. Additionally, in this embodiment, the vehicle body frame 14 supports the rear arms 28 via the bracket 27. However, a portion of the engine 15 may supports the rear arms 28.

A radiator 30 is disposed ahead of and above the cylinder block 25 of the engine 15 and below the main frame 17. A bracket 29 is affixed to the gusset 22 that is affixed to the bottom surface of the main frame 17. The bracket 29 supports the radiator 30.

A carburetor 33 is disposed above the crankcase 24 of the engine 15 and in the rear and the vicinity of the cylinder block 25. An air cleaner 34 is disposed in the rear of the carburetor 33. The air cleaner 34 is interposed between right and left separated portions of the vehicle body frame 14. That is, the air cleaner 34 is placed between the sub frame 18 and the seat rail 19 on the right hand side and the sub frame 18 and the seat rail 19 on the left hand side.

The seat front cover 12 includes a forward ascending portion that inclines downward rearward from a front portion thereof and a forward descending portion that inclines upward rearward from the front portion. The air cleaner 34 is positioned under the seat front cover 12. Specifically, the air cleaner 34 is positioned under the forward descending of the seat front cover 12. Thus, the seat front cover 12 covers a top of the air cleaner 34.

Figure 6:
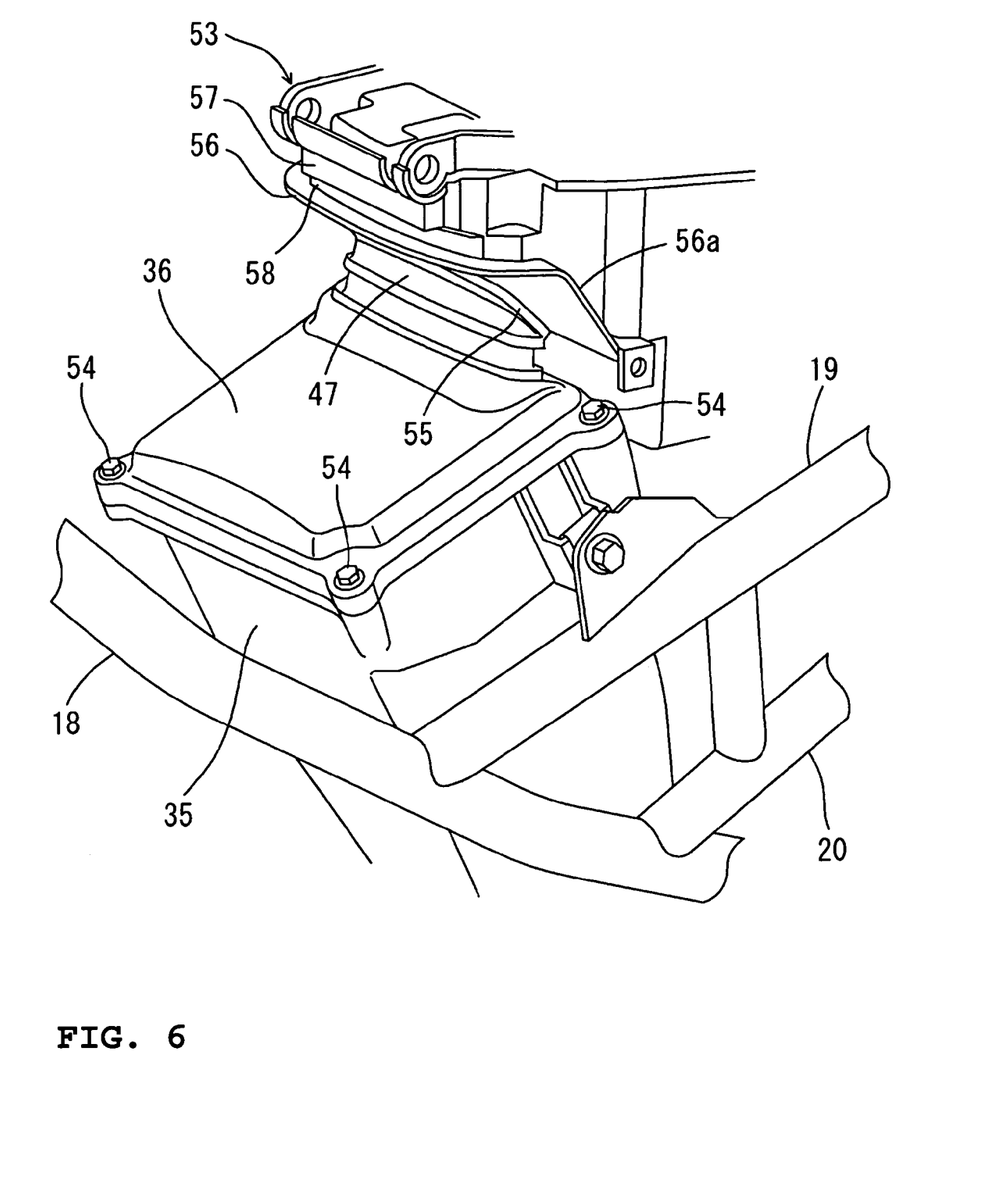
FIG. 6 is a perspective view of the air cleaner under the mounted condition.

The air cleaner 34 includes a cleaner case 35 and a lid 36. The cleaner case 35 and the lid 36 together form an air cleaner body. The air cleaner case 35 has a box shape such that a length thereof in a vertical direction is longer than either a length thereof in a fore to aft direction or a length thereof in a transverse direction. A top of the cleaner case 35 has an opening, and the lid 36 detachably covers the opening. As shown in FIG. 6, the lid 36 and the cleaner case 35 are coupled together by bolts 54 positioned at four corners of the lid 36. Thus, the lid 36 can be easily attached to or detached from the cleaner case 35 by fastening or removing the bolts 54. Also, the air cleaner 34 slants forward so that a top surface of the air cleaner 34 inclines to descend forward. Thus, the concave shape of the seat front cover 12 can be easily realized. A rider can easily get on and off the vehicle, accordingly, as described above.

Figure 3:
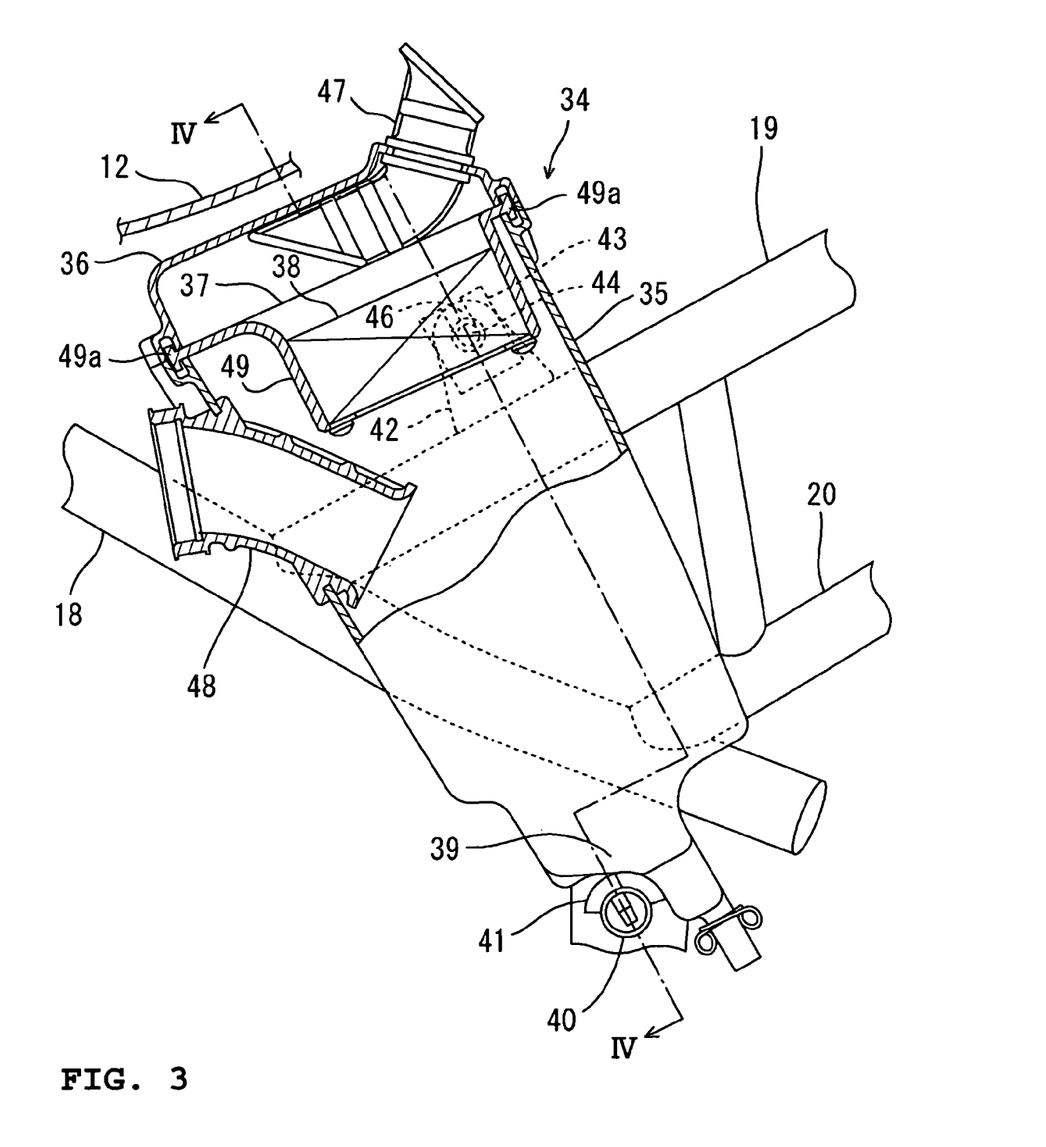
FIG. 3 is a partial cross sectional view of an air cleaner under a mounted condition thereof.

As shown in FIG. 2, the air cleaner 34 is supported in a forward slanting position so that a top end is positioned ahead of a bottom end. As shown in FIG. 3, respective meeting surfaces of the lid 36 and the cleaner case 35 extend generally parallel to the seat rails 19 and slant to descend forward. Therefore, when the seat front cover 12 is removed and the lid 36 is detached obliquely upward forward, the lid 36 can be taken out from the cleaner case 35. To the contrary, when the lid 36 is putted onto the cleaner case 35 obliquely downward rearward under the condition that the seat front cover 12 is removed, the lid 36 can be attached to the cleaner case 35.

Figure 4:
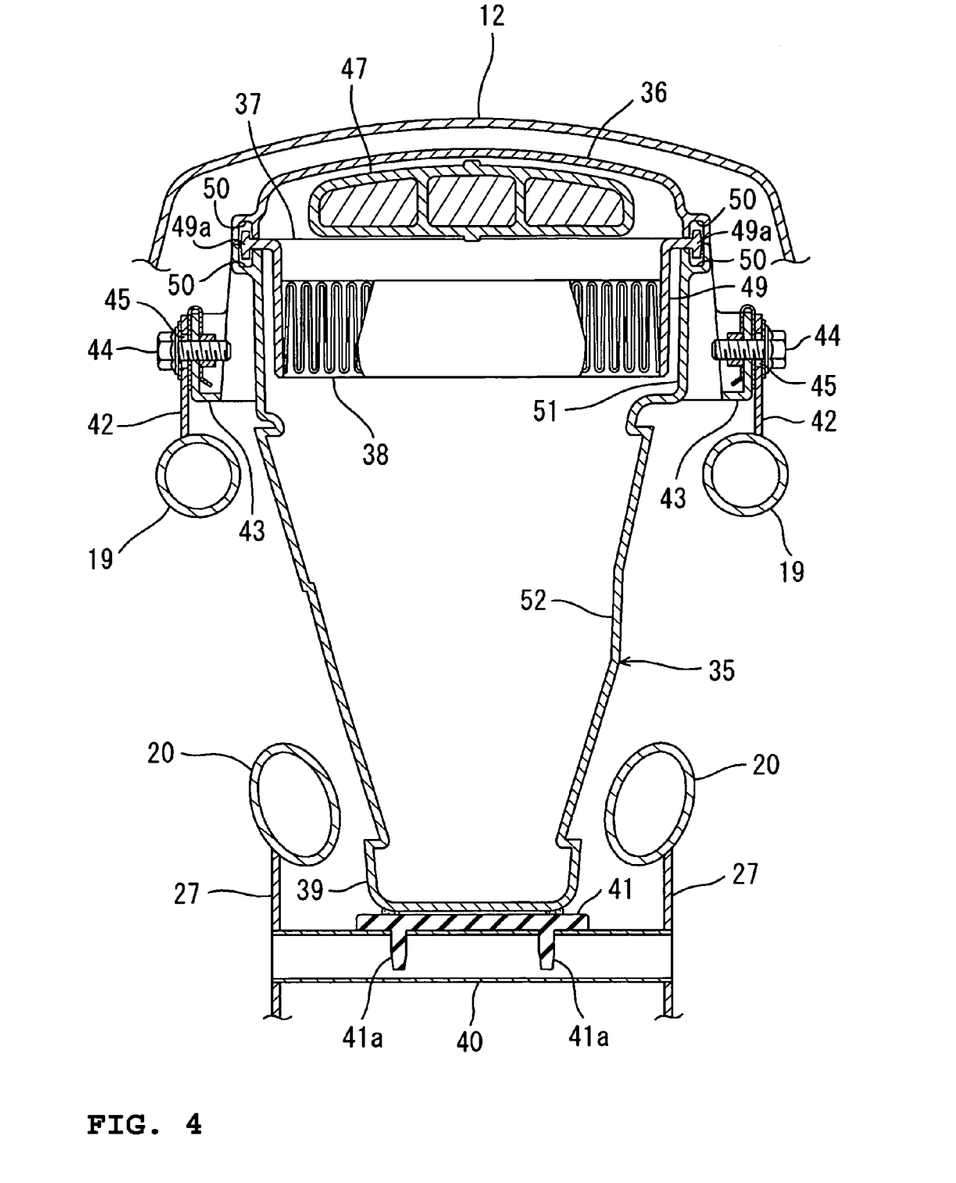
FIG. 4 is a cross sectional view, taken along the line IV-IV of FIG. 3.

As shown in FIG. 4, a cross pipe 40 extends between the right and left brackets 27. A lower portion of the cleaner case 35 is tapered downward and has a plurality of steps, including a step 39 (see FIG. 3). The step 39 of the cleaner case 35 is supported on the cross pipe 40 via a cushion rubber 41. Additionally, the cushion rubber 41 has a plurality of pins 41a extending downward. Those pins 41a are inserted into the cross pipe 40.

A bracket 42 having an aperture 45 is affixed to a top of each seat rail 19. Each upper portion of the respective right and left side surfaces of the cleaner case 35 has a sheet-like attachment 43 formed with a concave slit 46 (see FIG. 3) therein. Each bracket 42 and the respective attachment 43 are coupled together by a bolt 44 passing through the aperture 45 and the slit 46.

As discussed above, the cleaner case 35 is supported by the cross pipe 40 attached to the respective brackets 27 of the backstays 20 and by the respective brackets 42 of the right and left seat rails 19.

As shown in FIG. 4, a filter element 38 is enclosed in an upper space of the cleaner case 35. A holder 49 having a lying-T-shaped engaging portion 49a surrounds the girth of the filter element 38. A top end periphery of the cleaner case 35 has a groove 50 for receiving the engaging portion 49a of the holder 49. The engaging portion 49a engages with the groove 50 so that the cleaner case 35 detachably supports the holder 49. Additionally, a bottom end periphery of the lid 36 also has a groove 50 for receiving the engaging portion 49a of the holder 49.

The cleaner case 35 protrudes upward above the seat rails 19. Also, as described above, the cleaner case 35 is tapered downward. A width (breadth) of an air cleaner upper portion 51 positioned higher than the seat rails 19 is narrower than a width of an air cleaner lower portion 52 positioned lower than the seat rails 19. Further, the width of the air cleaner upper portion 51 is shorter than a length between a right end of the right hand side seat rail 19 and a left end of the left hand side seat rail 19. That is, the air cleaner 34 is formed not to extend beyond the right and left seat rails 19. The filter element 38 is placed in the air cleaner upper portion 51. The filter element 38 is therefore positioned higher than the seat rails 19.

As shown in FIG. 3, an intake pipe 47 extending obliquely upward rearward is inserted into a rear portion of the lid 36. The intake pipe 47 defines an air intake section of the air cleaner 34. One end of the intake pipe 47 has an air inlet port 47a (see FIG. 5) that opens obliquely upward rearward. Another end of the intake pipe 47 extends into the lid 36 and opens above the filter element 38. An air supply pipe 48 is inserted into the cleaner case 35 through a forward surface thereof to be connected to the carburetor 33 (not shown in FIG. 3, see FIG. 2). One end of the air supply pipe 48 opens at a location below the filter element 38 in the cleaner case 35. Additionally, the air supply pipe 48 opens obliquely downward at a generally center position in the vertical direction. Air taken through the intake pipe 47 passes through the filter element 38 and is supplied to the carburetor 33 through the air supply pipe 48.

As shown in FIG. 2, the intake pipe 47 of the air cleaner 34 is disposed within a space surrounded by the seat 11 and the forward descending portion of the seat front cover 12. The space above and in the rear of the intake pipe 47 is partitioned from the external space by a wall surface 75.

Figure 5:
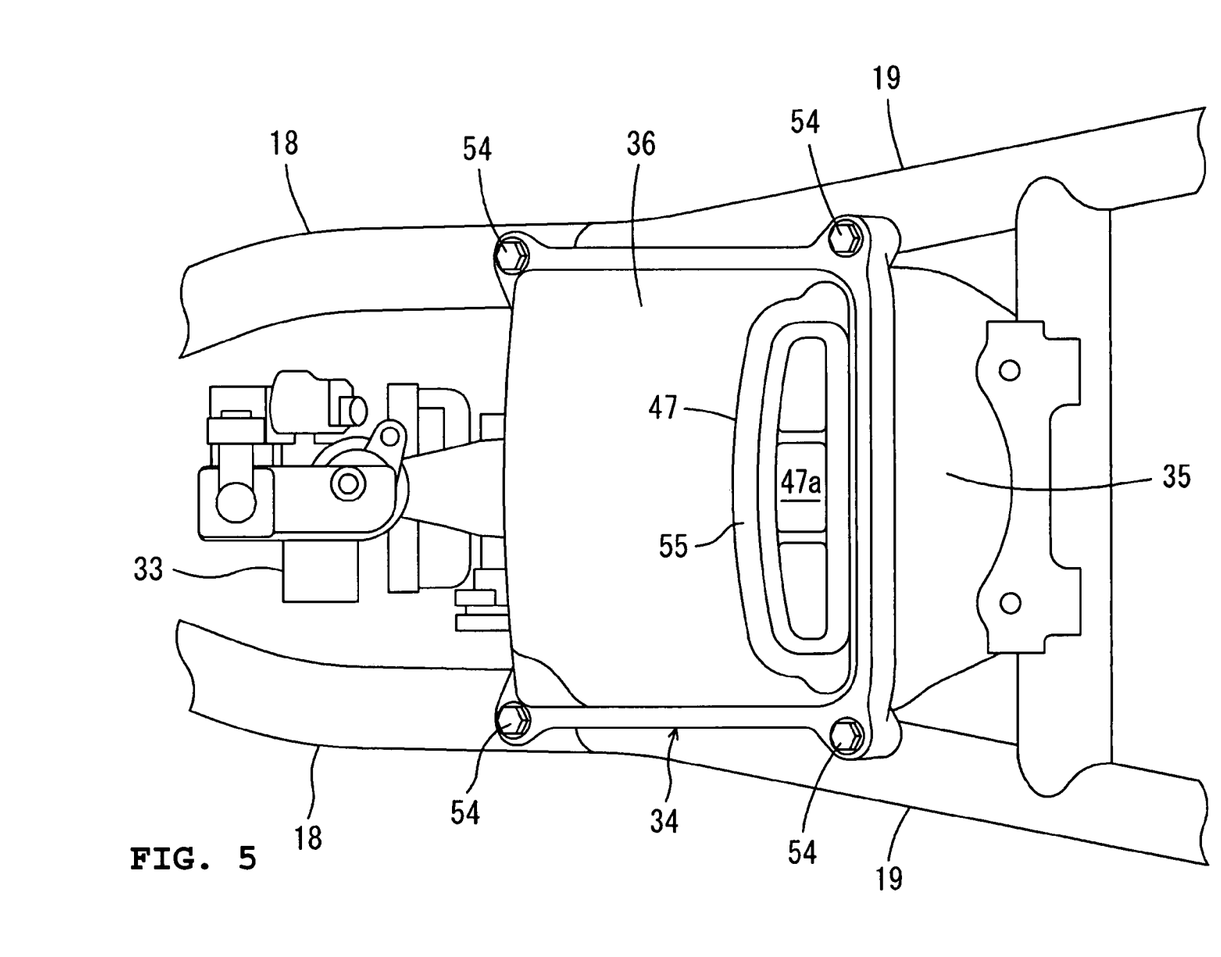
FIG. 5 is a top plan view of the air cleaner under the mounted condition.

As shown in FIG. 5, the intake pipe 47 is flat so as to be slender in the transverse direction. Therefore, a length of the intake pipe 47 in the fore to aft direction is short. The intake pipe 47 is directed to simply take the air existing in the rear of a center portion of the air cleaner 34 in the fore to aft direction. On the other hand, the intake pipe 47 has a sufficient opening area, even though the length in the fore to aft direction is short, because the length of the intake pipe 47 in the transverse direction is long. The intake pipe 47 has a flange 55 extending outward and circumferentially around an opening end.

As shown in FIG. 2, a hinge mechanism 53 is provided at a lower portion of a front end of the seat 11. The seat 11 pivots about the front end as a fulcrum via the hinge mechanism 53 to open and close.

As shown in FIG. 6, the intake pipe 47 is positioned below the hinge mechanism 53. Below the hinge mechanism 53, a block 57 projects forward, and a flange 56 projects forward and sideward on both sides below the block 57. As a result, a recess 58 concaving rearward is defined between the block 57 and the flange 56. Both right and left side portions of the flange 56 slant obliquely downward rearward to form slant surfaces 56a.

Figure 7:
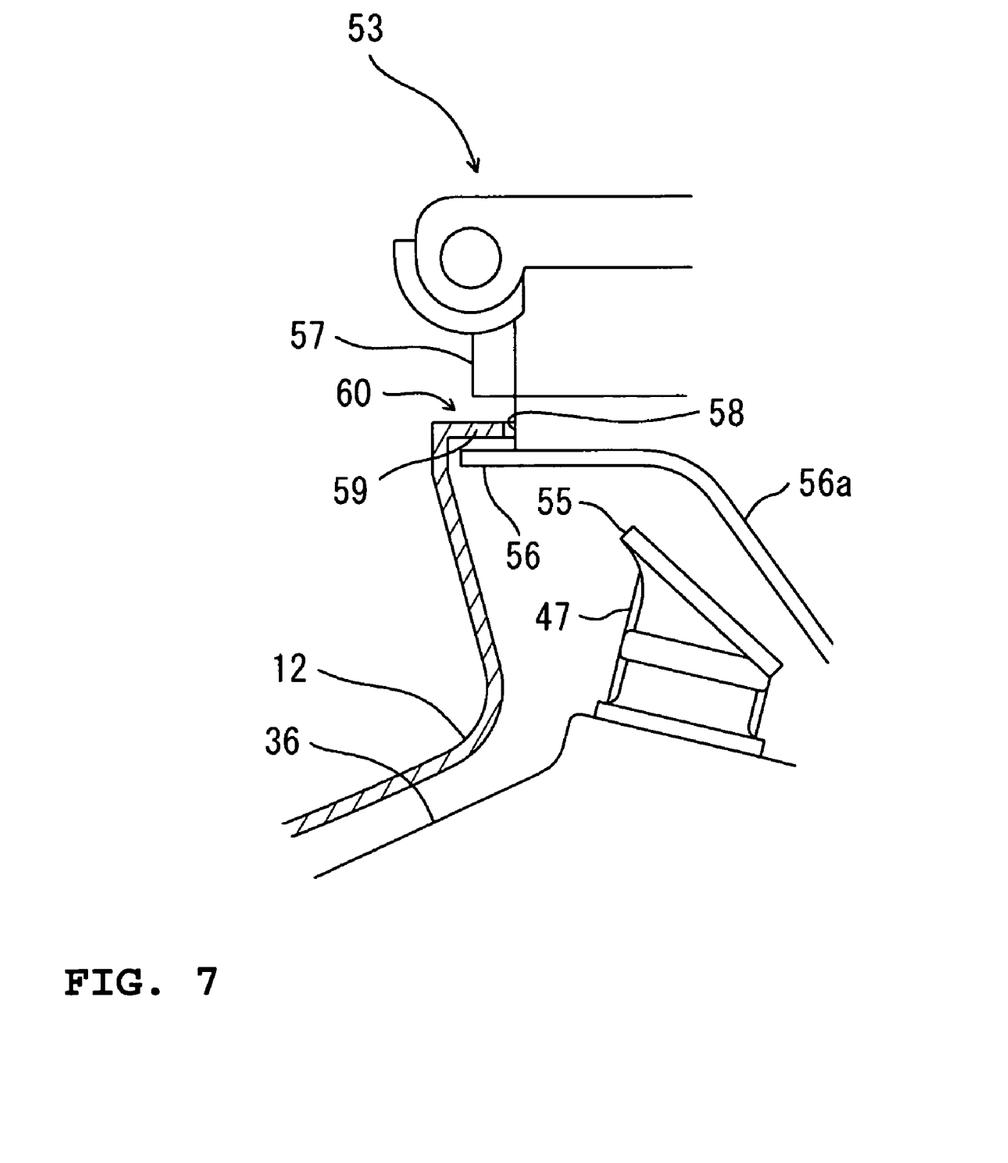
FIG. 7 is a cross sectional view of a labyrinth structure.

As shown in FIG. 7, the seat front cover 12 has a projection 59 extending rearward. The projection 59 opposes to the recess 58 under a condition that the projection 59 is interposed between the block 57 and the flange 56. As the result, a zigzag gap is made among the block 57, the projection 59 and the flange 56. The block 57, the projection 59 and the flange 56 overlap with each other in the vertical direction, as discussed, to form a labyrinth structure 60. The labyrinth structure 60 is positioned above (strictly speaking, obliquely forward upward) the intake pipe 47.

Additionally, as described above, the opening end of the intake pipe 47 has the flange 55. Accordingly, not only the block 57, the projection 59 and the flange 56 but also the entire combination of the block 57, the projection 59, the flange 56 and the flange 55 function as one labyrinth structure.

As shown in FIG. 2, a rear cushion unit 63 is disposed in the rear of the air cleaner 34. A cross member 64 extends between the right and left seat rails 19. An upper cushion bracket 67 is affixed to the cross member 64. The upper cushion bracket 67 protrudes downward to a location below the seat rails 19. The top end of the rear cushion unit 63 is supported by the upper cushion bracket 67.

Another cross member 65 extends between the right and left rear arms 28. A lower cushion bracket 68 is affixed to the cross member 65. The lower cushion bracket 68 supports a bottom end of the rear cushion unit 63. The lower cushion bracket 68 protrudes upward to a location above the rear arms 28. Thus, the bottom end of the rear cushion unit 63 is supported by an upper portion of the associated rear arm 28 that is positioned higher than a center position thereof (center line M of the rear arm 28) in the vertical direction.

As discussed, the rear cushion unit 63 extends between the upper cushion bracket 67 and the lower cushion bracket 68. The rear cushion unit 63 slants forward so that an upper supported end 69 is positioned ahead of a lower supported end 70, and extends generally parallel to the air cleaner 34.

As shown in FIG. 2, a battery 61 is disposed in the rear of and above the air cleaner 34, and ahead of and above the rear cushion unit 63. A fuel tank 62 is disposed in the rear of the battery 61. The battery 61 and the fuel tank 62 are positioned under the seat 11. The fuel tank 62 is interposed between the right and left seat rails 19 to be supported by the seat rails 19.

A portion of the fuel tank 62 is positioned lower than the seat rails 19. A lower portion of the fuel tank 62 projects downward to a space 73 defined between the rear cushion unit 63 and the rear wheel 32. A front portion of the fuel tank 62 has a front slant surface 71 slanting rearward while extending downward. A rear portion of the fuel tank 62 has a rear slant surface 72 slanting forward while extending downward.

The upper supported end 69 of the rear cushion unit 63 is positioned ahead of the fuel tank 62. A bottom end of the fuel tank 62 is positioned lower than the upper supported end 69 of the rear cushion unit 63. That is, the top support end of the rear cushion unit 63 is off forward from the bottom end of the fuel tank 62, and the fuel tank 62 and the rear cushion unit 63 partially overlap with each other in a front elevational view.

A storage box 74 for storing small articles etc. is disposed under the seat 11 and in the rear of the fuel tank 62. A top of the storage box 74 has an opening. When the seat 11 is moved to the open position, the opening is externally exposed. Thus, the articles can be putted into or out from the storage box 74 by moving the seat 11 between the open and closed positions.

As thus described, according to the motorcycle 10, the intake pipe 47 of the air cleaner 34 is positioned in the space surrounded by the seat 11 and the forward descending portion of the seat front cover 12 (see FIG. 2). Therefore, the intake pipe 47 is sufficiently spaced apart from the front wheel 21 and the rear wheel 32. Thus, even if mud or the like is raised up by the front wheel 21 or the rear wheel 32, the mud etc. is hardly sucked into the air cleaner 34 through the intake pipe 47.

Also, the intake pipe 47 is not only positioned higher than the front wheel 21 and the rear wheel 32 but also opens obliquely upward forward. In this point of view, again the suction of the mud etc. through the intake pipe 47 hardly occurs.

Conventionally, the space surrounded by the seat 11 and the forward descending portion of the seat front cover 12 is the so-called dead space that is not effectively used. Particularly, the space below the hinge mechanism 53 at the forward end of the seat 11 is the dead space that is not effectively used. According to the motorcycle 10, however, the dead space can be effectively used as a housing space for the intake pipe 47. Also, according to the motorcycle 10, because the seat front cover 12 is not required to be larger upward to house the intake pipe 47 therein, the space 13 in front of the seat 11 is not spoiled. Thus, the suction of the mud etc. to the air cleaner 34 can be effectively prevented while enjoying advantages of the frame structure of the under bone type.

The air cleaner 34 is disposed in the rear of the engine 15, and the intake pipe 47 is positioned at the rear side of the air cleaner 34. The air cleaner 34 (strictly, the air cleaner case 35 and the lid 36) thus is interposed between the engine 15 and the intake pipe 47, and the air cleaner 34 insulates the heat from the engine 15. Hot air is inhibited from being sucked through the intake pipe 47, accordingly. Therefore, the temperature of the air supplied to the engine 15 falls, and the density of the sucked air becomes higher. The efficiency of the engine 15 thus is improved.

Additionally, because the intake pipe 47 is directly coupled with the lid 36 of the air cleaner 34, the distance between the intake pipe 47 and the air cleaner 34 is short. Thus, the intake resistance of the inlet side of the air cleaner 34 is small.

Also, according to the motorcycle 10, the labyrinth structure 60 is formed above the intake pipe 47 (see FIG. 7). Therefore, even if drops of water fall from the seat 11 when it rains or on other occasions, the labyrinth structure 60 prevents the downward movement of the drops of water. The drops of water thus hardly enter the intake pipe 47, even though the intake pipe 47 opens obliquely upward. That is, water hardly enters the air cleaner 34 through the intake pipe 47.

As shown in FIG. 2, the space above and behind the intake pipe 47 is generally partitioned from the external space by the wall surface 75. Thus, the mud etc. can be effectively prevented from entering the intake pipe 47 from a location in the rear thereof. Additionally, the wall surface 75 can be defined by an exclusively prepared partition. Alternatively, a portion of a vehicle component can define the wall surface 75. For example, a vehicle component such as a battery, a fuel tank, a storage box or the like can be positioned in the rear of the intake pipe 47 to define the wall surface 75 with the use of a portion of the vehicle component.

Further, according to the motorcycle 10, cleaning of the filter element 38 or replacement thereof with new one can be easily made by removing the seat front cover 12 and taking out the lid 36 of the air cleaner 34 obliquely upward forward.

That is, maintenance work of the air cleaner 34 can be made by an approach from an upper location or an obliquely front and upper location. The user thus can replace the filter element 38 with new one or can make other work without stooping or squatting down, i.e., can make the maintenance work for the air cleaner 34 in a comfortable posture of the user.

Particularly, in the motorcycle 10, because the respective meeting surfaces 37 of the lid 36 and the cleaner case 35 incline to descend forward, and the lid 36 is putted on or taken out obliquely upward forward, the seat 11 or the seat rails 19 do not disturb the attaching or detaching work of the lid 36. Thus, the attaching or detaching work of the lid 36 is easy, and the maintenance work for the air cleaner 34 can be easily made.

Because the air cleaner 34 has the box shape that is taller than is broad, the capacity of the air cleaner 34 can be made large without increasing the length of the vehicle in the fore to aft direction or the width thereof. Additionally, the maintenance work of the air cleaner 34 can be made by the approach from the upper location or the obliquely front and upper location. Thus, unlike the maintenance work made by an approach from a lateral side location, the maintenance work is not difficult even though the air cleaner 34 has the shape that is taller than is broad.

Because the air cleaner 34 is supported in the forward slanting position, the length of the air cleaner 34 in the vertical direction (apparent length in the vertical direction) when it is set is shorter than the length of the air cleaner 34 itself in the vertical direction. Thus, the seat 11 positioned above the air cleaner 34 can be placed at a relatively low position. Also, the air cleaner 34 can be efficiently positioned in the narrow space under the seat front cover 12 by making the air cleaner 34 slant forward.

According to the motorcycle 10, the air cleaner 34 is interposed between the right and left sub frames 18 and seat rails 19, and the upper portion of the air cleaner 34 protrudes upward above the seat rails 19 (see FIG. 4). As discussed, because the seat rails 19 can be placed at a relatively low position, the vehicle can be made slimmer than ever.

Particularly, in the motorcycle 10, the width of the air cleaner 34 is shorter than the distance between the right end of the seat rail 19 on the right hand side and the left end of the seat rail 19 on the left hand side. The air cleaner 34 thus does not extend out beyond the right and left seat rails 19. The vehicle is slimmer, accordingly, even though the air cleaner 34 is positioned between the right and left seat rails 19.

Also, according to the motorcycle 10, the width of the air cleaner upper portion 51 is larger than the width of the air cleaner lower portion 52. Thus, the handling of the air cleaner upper portion 51 is easier for the user. Therefore, the maintenance work of the air cleaner 34 that is made by approaching downward or obliquely downward can be more easily made.

The filter element 38 of the air cleaner 34 is positioned in the upper space of the cleaner case 35. Thus, the filter element 38 can be easily cleaned or replaced with new one by removing the lid 36, without being disturbed by the seat rails 19 etc. Also, because the filter element 38 and the seat rail 19 do not overlap with each other in the transverse direction, the distance between the right and left seat rails 19 does not need to be enlarged even though a width of the filter element 38 becomes larger. The vehicle can be made slimmer than ever, accordingly.

Also, according to the motorcycle 10, the rear cushion unit 63 slants relatively steeply so that the upper supported end 69 is positioned forwarder than the fuel tank 62. The lower portion of the fuel tank 62 projects to the space 73 defined between the rear cushion unit 63 and the rear wheel 32. Accordingly, the fuel tank 62 can be made deeper without interfering with the fuel tank 62 and the rear cushion unit 63. Particularly, according to the motorcycle 10, the bottom end of the fuel tank 62 is positioned lower than the upper supported end 69 of the rear cushion unit 63, and thus the fuel tank 62 becomes extremely deep.

Thus, according to the motorcycle 10, the length of the fuel tank 62 in the fore to aft direction or the width thereof can be smaller. Therefore, the area of the fuel tank 62 in the top plan view can be smaller, and the degree of freedom for the layout of vehicle components under the seat 11 can be increased. Additionally, in the motorcycle 10, because the length of the fuel tank 62 in the fore to aft direction becomes shorter, the storage box 74 that has a sufficient space is provided in the rear of the fuel tank 62.

The lower supported end 70 of the rear cushion unit 63 is supported by an upper portion of the rear arm 28. Thus, the rear cushion unit 63 can extend along the locus of the pivotal movement of the rear arm 28 about the axis of the pivot shaft 31. The suspension performance of the rear cushion unit 63 can be improved, accordingly.

The rear cushion unit 63 extends generally parallel to the air cleaner 34. Therefore, sufficient use of the space in the rear of the air cleaner 34 can be made. As a result, the rear cushion unit 63 and the air cleaner 34 can be efficiently positioned in the limited space.

Also, according to the motorcycle 10, the battery 61 is placed in the space defined in front of the fuel tank 62 and above the rear cushion unit 63. Thus, the space under the seat 11 is effectively used, and the fuel tank 62, the rear cushion unit 63 and the battery 61 can be efficiently arranged.

The forward portion of the fuel tank 62 has the forward slant surface 71 that slants rearward. Thus, because the forward portion of the fuel tank 62 can extend along the rear cushion unit 63, any possible interference between the fuel tank 62 and the rear cushion unit 63 can be avoided, even though the fuel tank 62 is deep enough. Also, the rear portion of the fuel tank 62 has the rear slant surface 72 that slants forward. Thus, because the rear portion of the fuel tank 62 can extend along the rear wheel 32, any possible interference between the fuel tank 62 and the rear cushion unit 63 can be avoided, even though the fuel tank 62 is deep enough.

As thus described, the present invention is useful for straddle type vehicles including motorcycles or the like.

The invention claimed is:

1. A straddle vehicle comprising:
a vehicle body including a vehicle body frame having a head pipe connected to a shaft that supports a front wheel for rotation, a front frame connected to the head pipe and obliquely extending downward rearward, and a rear frame connected to the front frame and obliquely extending upward rearward, and an engine including a crankcase and a cylinder block extending forward therefrom, the engine being supported by the front frame;
a seat supported by the rear frame; a rear arm supported by the vehicle body for swinging and extending rearward;
a rear wheel supported by the rear arm for rotation, and positioned under, or obliquely below and in the rear of a rear portion of the seat;
a seat frontcover that is positioned below and ahead of the seat to define a space recessed downward as a top open concave, in a side elevational view, by continuously forming a forward ascending portion that inclines downward rearward from a front portion thereof and a forward descending portion that inclines upward rearward from the front portion; and an air cleaner including an air intake portion disposed within a space surrounded by the seat and the forward descending portion of the seat front cover.

2. The straddle vehicle according to claim 1, wherein the air cleaner has a box air cleaner body in which the air intake portion is positioned, the air cleaner body is disposed in the rear of the cylinder block of the engine, and the air intake portion is positioned at a rear side of the air cleaner body.

3. The straddle vehicle according to claim 1 or 2, wherein the air intake portion has an inlet port opening upward or obliquely upward.

4. The straddle vehicle according to claim 1 or 2, further comprising a hinge mechanism provided at a lower portion of a front end of the seat, and the air intake portion is positioned below the hinge mechanism.

5. The straddle vehicle according to claim 4, further comprising a labyrinth structure including a first irregular portion that is formed at the lower portion of the front end of the seat to be concave or convex forward, and a second irregular portion that is formed at the seat front cover to be convex or concave rearward, wherein the first irregular portion and the second irregular portion oppose to each other to make a zigzag gap therebetween in a fore to aft direction.

6. The straddle vehicle according to claim 1 or 2, wherein a wall surface is positioned below the seat to partition a space above or in the rear of the air intake portion from the external space.

* * * * *